United States Patent
Itzel et al.

(10) Patent No.: US 10,774,656 B2
(45) Date of Patent: Sep. 15, 2020

(54) TURBINE AIRFOIL MULTILAYER EXTERIOR WALL

(71) Applicant: General Electric Company, Schenectady, NY (US)

(72) Inventors: Gary Michael Itzel, Simpsonville, SC (US); Jeffrey Clarence Jones, Simpsonville, SC (US); James William Vehr, Easley, SC (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 15/948,207

(22) Filed: Apr. 9, 2018

(65) Prior Publication Data

US 2019/0309634 A1    Oct. 10, 2019

(51) Int. Cl.
   *F01D 5/18*    (2006.01)
   *F01D 5/28*    (2006.01)
   (Continued)

(52) U.S. Cl.
   CPC ............... *F01D 5/188* (2013.01); *B33Y 80/00* (2014.12); *F01D 5/288* (2013.01); *B22F 3/1055* (2013.01);
   (Continued)

(58) Field of Classification Search
   CPC . F01D 5/18; F01D 5/182; F01D 5/183; F01D 5/184; F01D 5/185; F01D 5/186;
   (Continued)

(56) References Cited

U.S. PATENT DOCUMENTS

| 3,698,834 A | 10/1972 | Meginnis |
| 4,312,186 A * | 1/1982 | Reider .................... F23R 3/002 60/754 |

(Continued)

FOREIGN PATENT DOCUMENTS

| EP | 3034782 A1 | 6/2016 |
| EP | 3064707 A1 | 7/2016 |

OTHER PUBLICATIONS

Magerramova, Liubov & Vasilyev, Boris & Kinzburskiy, Vladimir. (2016). Novel Designs of Turbine Blades for Additive Manufacturing. V05CT18A001. 10.1115/GT2016-56084. (Year: 2016).*

*Primary Examiner* — Richard A Edgar
*Assistant Examiner* — Maranatha Boardman
(74) *Attorney, Agent, or Firm* — James Pemrick; Hoffman Warnick LLC (57) ABSTRACT

An airport having an exterior wall including a plurality of spaced layers for improved cooling and lifetime is disclosed. The airfoil and exterior wall are made by additive manufacturing. The exterior wall includes an exterior layer, an intermediate layer, and an interior layer each separated from adjacent layers by a plurality of standoff members; a plurality of first cooling chambers between the exterior and intermediate layers, the chambers partitioned by a first partitioning wall; a plurality of second cooling chambers between the intermediate and interior layers, the chambers partitioned by a second partitioning wall; a thermal barrier coating on the exterior layer; a plurality of impingement openings in the intermediate layer and a second plurality of impingement openings in the interior layer; and a plurality of cooling passages in the exterior layer. The exterior layer may also include plateaus on an exterior face through which the cooling passages extend.

20 Claims, 8 Drawing Sheets

(51) Int. Cl.
*B33Y 80/00* (2015.01)
*B33Y 10/00* (2015.01)
*B22F 3/105* (2006.01)

(52) U.S. Cl.
CPC ......... *B33Y 10/00* (2014.12); *F05D 2260/201* (2013.01); *F05D 2260/202* (2013.01); *F05D 2260/231* (2013.01)

(58) Field of Classification Search
CPC .......... F01D 5/187; F01D 5/188; F01D 5/189; F05D 2260/20; F05D 2260/202; F05D 2260/204; F05D 2230/90; F05D 2300/611; B33Y 80/00; B33Y 10/00; B22F 3/1055
See application file for complete search history.

(56) References Cited

U.S. PATENT DOCUMENTS

| | | |
|---|---|---|
| 7,670,675 B2 | 3/2010 | Heselhaus |
| 8,608,430 B1 | 12/2013 | Liang |
| 9,422,828 B2 | 8/2016 | Morrison et al. |
| 9,683,444 B1 | 6/2017 | Jones |
| 2009/0074576 A1 | 3/2009 | Brostmeyer |
| 2014/0102684 A1 | 4/2014 | Sezer et al. |
| 2016/0160760 A1 | 6/2016 | Romanov et al. |
| 2017/0328212 A1 | 11/2017 | Bunker |

* cited by examiner

TURBINE AIRFOIL MULTILAYER EXTERIOR WALL

BACKGROUND OF THE INVENTION

The disclosure relates generally to cooling of components, and more particularly, to a multilayer wall of a hot gas path component that is made by additive manufacturing.

Hot gas path components that are exposed to a working fluid at high temperatures are used widely in industrial machines. For example, a gas turbine system includes a turbine with a number of stages with blades extending outwardly from a supporting rotor disk. Each blade includes an airfoil exposed to the flow of hot combustion gases. The airfoil must be cooled to withstand the high temperatures produced by the combustion gases. Insufficient cooling may result in undo stress and oxidation on the airfoil and may lead to fatigue and/or damage. The airfoil thus is generally hollow with one or more internal cooling flow circuits leading to a number of cooling holes and the like. Cooling air is discharged through the cooling holes to provide film cooling to the outer surface of the airfoil. Other types of hot gas path components and other types of turbine components may be cooled in a similar fashion.

Although many models and simulations may be performed before a given component is put into operation in the field, the exact temperatures to which a component or any area thereof may reach vary greatly due to component-specific hot and cold locations. Specifically, the component may have temperature-dependent properties that may be adversely affected by overheating. As a result, many hot gas path components may be overcooled to compensate for localized hot spots that may develop on the components. Such excessive overcooling, however, may have a negative impact on overall industrial machine output and efficiency.

Despite the presence of cooling passages many components also rely on a thermal barrier coating (TBC) applied to an outer surface thereof to protect the component. If a break, crack, or loss referred to as a spall, occurs in a TBC of a hot gas path component, the local temperature of the component at the spall may rise to a harmful temperature. For example, the spall may expose the exterior wall of the hot gas path component to the high temperature fluid causing the exterior surface to oxidize, shortening the lifetime of the hot gas path component. One approach to a TBC spall provides a plug in a cooling hole under the TBC. When a spall occurs, the plug is removed, typically through exposure to heat sufficient to melt the plug, the cooling hole opens and a cooling medium can flow from an internal cooling circuit fluidly coupled to the cooling hole. The plug may be porous to assist in its removal. This process reduces overcooling. Formation of the plug however is complex, requiring precise machining and/or precise thermal or chemical processing of materials to create the plug.

BRIEF DESCRIPTION OF THE INVENTION

A first aspect of the disclosure provides a turbine airfoil, the airfoil including: an exterior wall including: a plurality of spaced layers including an exterior layer, an intermediate layer, and an interior layer, wherein each of the plurality of spaced layers are separated from an adjacent spaced layer by a plurality of standoff members; a first space between the exterior layer and the intermediate layer defining a first cooling chamber; a second space between the intermediate layer and the interior layer defining a second cooling chamber; a first partition wall axially partitioning the first cooling chamber into a plurality of first cooling chambers; a second partition wall axially partitioning the second cooling chamber into a plurality of second cooling chambers; a thermal barrier coating (TBC) disposed on an exterior face of the exterior layer, the TBC having an exterior face configured to be exposed to a working fluid having a high temperature; a first plurality of impingement openings within the interior layer, the first plurality of impingement openings providing a passageway for a cooling medium from a central cooling chamber of the turbine airfoil to at least one of the plurality of second cooling chambers; a second plurality of impingement openings within the intermediate layer, the second plurality of impingement openings providing a passageway for the cooling medium from at least one of the plurality of second cooling chambers to at least one of the plurality of first cooling chambers; and a plurality of cooling passages within the exterior layer, the plurality of cooling passages providing a passageway for the cooling medium from at least one of the plurality of first cooling chambers to the exterior face of the TBC.

A second aspect of the disclosure provides a hot gas path (HGP) component, the airfoil including: an exterior wall including: a plurality of spaced layers including an exterior layer, an intermediate layer, and an interior layer, wherein each of the plurality of spaced layers are separated from an adjacent spaced layer by a plurality of standoff members; a first space between the exterior layer and the intermediate layer defining a first cooling chamber; a second space between the intermediate layer and the interior layer defining a second cooling chamber; a first partition wall axially partitioning the first cooling chamber into a plurality of first cooling chambers; a second partition wall axially partitioning the second cooling chamber into a plurality of second cooling chambers; a thermal barrier coating (TBC) disposed on an exterior face of the exterior layer, the TBC having an exterior face configured to be exposed to a working fluid having a high temperature; a first plurality of impingement openings within the interior layer, the first plurality of impingement openings providing a passageway for a cooling medium from a central cooling chamber of the turbine airfoil to at least one of the plurality of second cooling chambers; a second plurality of impingement openings within the intermediate layer, the second plurality of impingement openings providing a passageway for the cooling medium from at least one of the plurality of second cooling chambers to at least one of the plurality of first cooling chambers; a plurality of plateaus disposed on the exterior face of the exterior layer, wherein an uppermost face of each plateau in the plurality of plateaus is free from the TBC; and a plurality of cooling passages within the exterior layer, each cooling passage in the plurality of cooling passages disposed to pass through one plateau of the plurality of plateaus, and wherein the plurality of cooling passages provides a passageway for the cooling medium from at least one of the plurality of first cooling chambers to the exterior face of the TBC.

A third aspect of the disclosure provides a method, including: additively manufacturing a turbine airfoil, the turbine airfoil including: an exterior wall having: a plurality of spaced layers including an exterior layer, an intermediate layer, and an interior layer, wherein each of the plurality of spaced layers are separated from an adjacent spaced layer by a plurality of standoff members; a first space between the exterior layer and the intermediate layer defining a first cooling chamber; a second space between the intermediate layer and the interior layer defining a second cooling chamber; a first partition wall axially partitioning the first cooling chamber into a plurality of first cooling chambers; a second partition wall axially partitioning the second cooling chamber into a plurality of second cooling chambers; a first plurality of impingement openings within the interior layer, the first plurality of impingement openings providing a passageway for a cooling medium from a central cooling chamber of the turbine airfoil to at least one of the plurality of second cooling chambers; a second plurality of impingement openings within the intermediate layer, the second plurality of impingement openings providing a passageway for the cooling medium from at least one of the plurality of second cooling chambers to at least one of the plurality of first cooling chambers; and a plurality of cooling passages within the exterior layer, the plurality of cooling passages providing a passageway for the cooling medium from at least one of the plurality of first cooling chambers to an exterior face of the external layer; and applying a thermal barrier coating (TBC) on the exterior face of the exterior layer, the TBC having an exterior face configured to be exposed to a working fluid having a high temperature.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within an industrial machine such as a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. It will be appreciated that such terms may be applied in relation to the center axis of the turbine.

As indicated above, the disclosure provides a hot gas path (HGP) component in the form of a turbine airfoil including an exterior wall having multiple layers. The layers of the external wall of the turbine airfoil may be spaced to form cooling chambers therebetween. The cooling chambers may each be axially partitioned into multiple cooling chambers by partition walls extending between the layers. The exterior layer of the exterior wall of the turbine airfoil may include multiple cooling passages allowing for a cooling fluid flow from at least one of the cooling chambers to an external surface of the turbine airfoil. The exterior layer may also include a thermal barrier coating (TBC) on the outer surface thereof. The layers of the external wall other than the exterior layer may each include multiple impingement openings to allow cooling fluids to flow between a central chamber of the turbine airfoil and at least one of the cooling chambers.

The turbine airfoil exterior wall and the structures thereof may be formed by additive manufacturing. When a spall in a thermal barrier coating (TBC) exposes the exterior layer of a multilayer exterior wall to a high temperature environment, the structure of the wall allows a cooling fluid flow to pass from the central chamber of the turbine airfoil through the cooling chambers to an interior face of the exterior layer to slow down the oxidation of the exposed exterior layer. After oxidation through the exterior layer exposes at least one of the other layers of the wall, the cooling chambers and impingement openings may allow the cooling fluid flow to form a slot film over the opening in the exposed exterior layer. Before spalls are formed, the cooling chambers and impingement openings allow the cooling fluid flow to contact the interior face of the exterior layer to cool the layer. The turbine airfoil exterior wall and the structures thereof as discussed herein may increase the lifetime of the airfoil in a situation wherein a spall is formed in the TBC.

Figure 1:
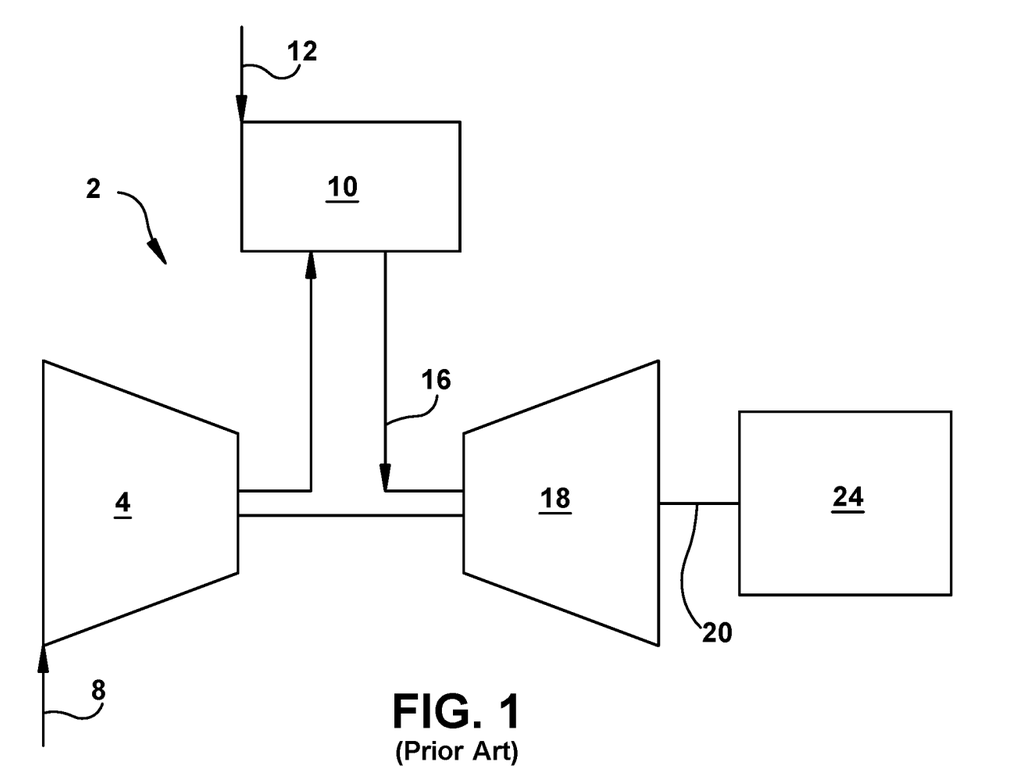
FIG. 1 is a schematic diagram of an illustrative industrial machine having a hot gas path component in the form of a gas turbine system.

Referring now to the drawings, in which like numerals refer to like elements throughout the several views, FIG. 1 shows a schematic view of an illustrative industrial machine in the form of a gas turbine system 2. While the disclosure will be described relative to gas turbine system 2, it is emphasized that the teachings of the disclosure are applicable to any industrial machine having a hot gas path component requiring cooling. Gas turbine system 2 may include a compressor 4. Compressor 4 compresses an incoming flow of air 8, and delivers the compressed flow of air 8 to a combustor 10. Combustor 10 mixes the compressed flow of air 8 with a pressurized flow of fuel 12 and ignites the mixture to create a flow of combustion gases 16. Although only a single combustor 10 is shown, gas turbine system 2 may include any number of combustors 10. Flow of combustion gases 16 is in turn delivered to a turbine 18. Flow of combustion gases 16 drives turbine 18 so as to produce mechanical work. The mechanical work produced in turbine 18 drives compressor 4 via a shaft 20 and an external load 24 such as an electrical generator and the like.

Gas turbine system 2 may use natural gas, liquid fuels, various types of syngas, and/or other types of fuels and blends thereof. Gas turbine system 2 may be, for example, any one of a number of different gas turbine engines offered by General Electric Company of Schenectady, N.Y. Gas turbine system 2 may have different configurations and may use other types of components. Teachings of the disclosure may be applicable to other types of gas turbine systems and or industrial machines using a hot gas path. Multiple gas turbine systems, or types of turbines, and or types of power generation equipment also may be used herein together.

Figure 2:
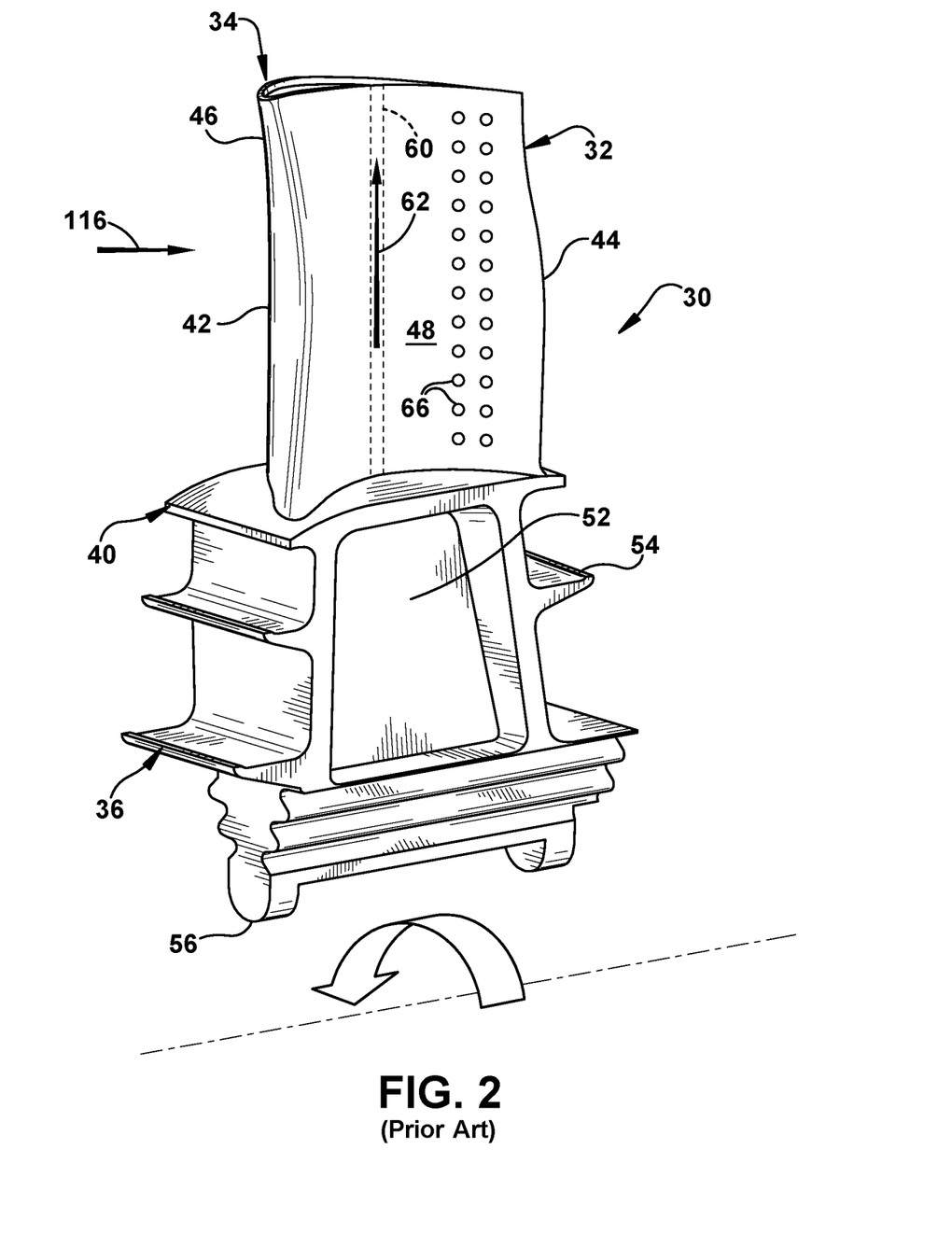
FIG. 2 is a perspective view of a known hot gas path component in the form of a turbine airfoil.

FIG. 2 shows an example a hot gas path (HGP) component 30 having a turbine airfoil 32 that may be used in the hot gas path (HGP) of turbine 18 (FIG. 1) and the like. While the disclosure will be described relative to turbine airfoil 32 and more specifically an exterior wall 34 thereof, it is emphasized that the teachings of the disclosure are applicable to any hot gas path (HGP) component requiring cooling. Generally described, HGP component 30 may include airfoil 32, a shank portion 36, and a platform 40 disposed between airfoil 32 and shank portion 36. Airfoil 32 generally extends radially outward from platform 40 and includes a leading edge 42 and a trailing edge 44. Airfoil 32 also may include a concave surface defining a pressure side 48 and an opposite convex surface defining a suction side 46. Platform 40 may be generally horizontal and planar. Shank portion 36 may extend radially downward from platform 40 such that platform 40 generally defines an interface between airfoil 32 and shank portion 36. Shank portion 36 may include a shank cavity 52. Shank portion 36 also may include one or more angel wings 54 and a root structure 56 such as a dovetail and the like. Root structure 56 may be configured to secure, with other structure HGP component 30 to shaft 20 (FIG. 1). Any number of HGP components 30 may be circumferentially arranged about shaft 20 (FIG. 1). Other components and or configurations also may be used herein.

Turbine airfoil 32 may include one or more cooling circuits 60 extending therethrough for flowing a cooling medium 62 such as air from compressor 4 (FIG. 1) or from another source. Steam and other types of cooling mediums 62 also may be used herein. Cooling circuits 60 and cooling medium 62 may circulate at least through portions of airfoil 32, shank portion 36, and platform 40 in any order, direction, or route. Many different types of cooling circuits and cooling mediums may be used herein in any orientation. Cooling circuits 60 may lead to a number of cooling passageways 66 or other types of cooling pathways for film cooling about airfoil 32 or elsewhere. Other types of cooling methods may be used. Other components and or configurations also may be used herein.

Figure 3:
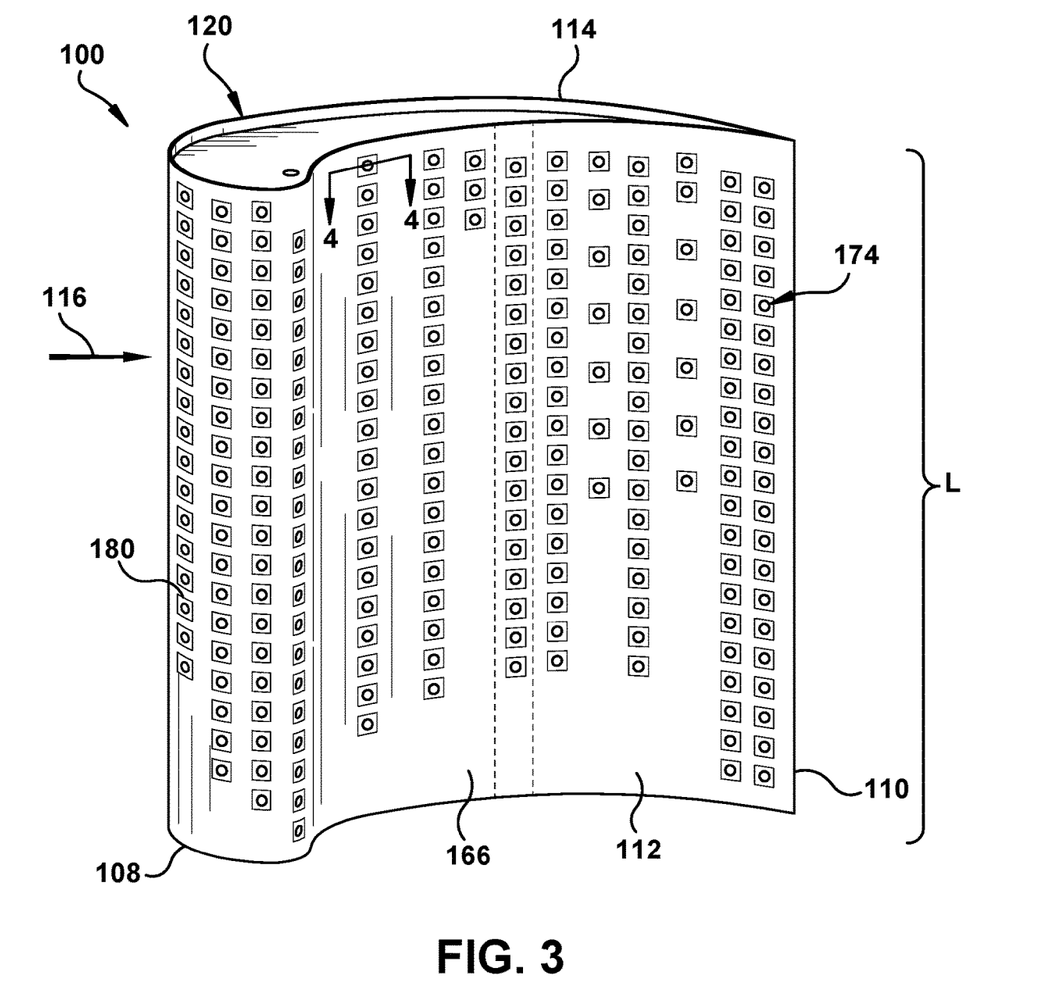
FIG. 3 is a perspective view of a hot gas path component in the form of a turbine airfoil, according to embodiments of the disclosure.
Figure 4:
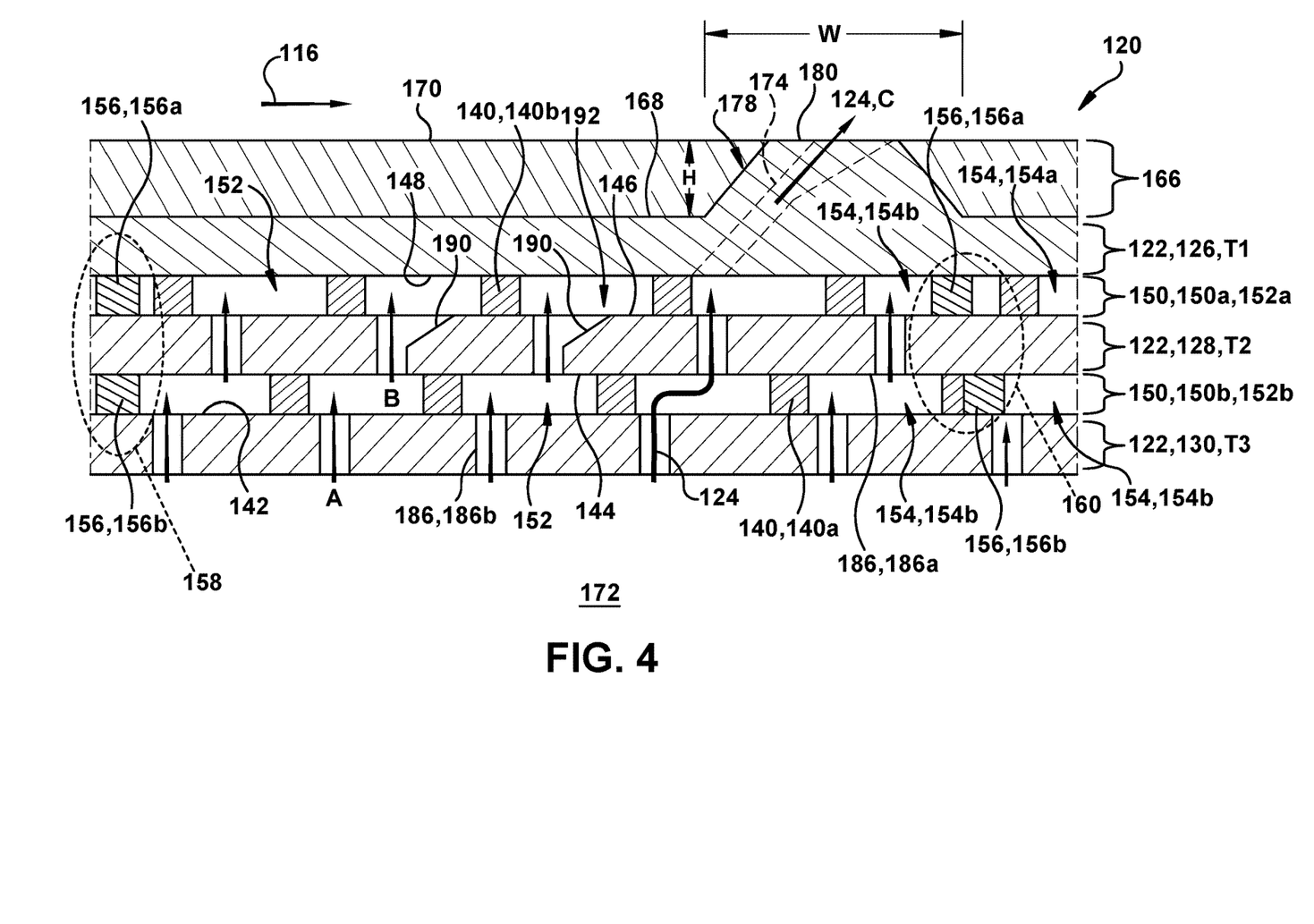
FIG. 4 is a cross-sectional view of a portion of a multilayer exterior wall of the turbine airfoil, according to embodiments of the disclosure.

FIGS. 3-4 show an example of a HGP component in the form of a turbine airfoil 100 (hereinafter airfoil 100) as may be described herein. FIG. 3 is a perspective view of airfoil 100, and FIG. 4 is a cross-sectional view of a portion of an exterior wall 120 of airfoil 100. Although a portion of airfoil 100 is shown in FIG. 4, it is understood that exterior wall 120 and the structures thereof may extend along a portion of or an entirety of the perimeter of airfoil 100.

Exterior wall 120 and the structures thereof as described herein are not limited to airfoil 100. As discussed above, although described herein with respect to airfoil 100, the structure of the disclosure may be a part of a blade; a vane; or any type of air-cooled component including a shank, a platform, or any type of hot gas path component. Other types of HGP components and other configurations may be used herein. The structure of the disclosure may also be applicable to nozzles (e.g., stator nozzles, nozzle sidewalls, etc.), shrouds, heat shields and/or combustion components.

Similar to that described above, airfoil 100 may include a leading edge 108 and a trailing edge 110. Likewise, airfoil 100 may include a pressure side 112 and a suction side 114. A working fluid 116 may flow along an exposed thermal barrier coating (TBC) 166 of airfoil 100 from the leading edge to the trailing edge. Working fluid 116 may include a high temperature. As used herein, "high temperature" depends on the form of industrial machine, e.g., for gas turbine system 2, high temperature may be any temperature greater than 100 degrees Celsius (° C.).

As shown in FIGS. 3 and 4, airfoil 100 may include exterior wall 120, according to embodiments of the disclosure. As best shown in FIG. 4, exterior wall 120 includes a plurality of spaced layers 122. As will be discussed in further detail herein, the plurality of spaced layers 122 may improve the cooling of exterior wall 120 and/or airfoil 100 by a cooling medium 124 flowing through airfoil 100. Exterior wall 120 of airfoil 100 may include an exterior layer 126, an intermediate layer 128, and an interior layer 130. Each spaced layer 122 may include a thickness of approximately 0.020 inches to approximately 0.100 inches. Two or more spaced layers 122 may be formed to include the same and/or different thicknesses. In the example of FIG. 4, exterior layer 126 may include a thickness T1 substantially equal to a thickness T2 of intermediate layer 128 and/or thickness T3 of interior layer 130. Although three layers are shown, it is understood that exterior wall 120 may include any desired number (e.g., five layers, ten layers, twenty layers, etc.) of spaced layers 122, i.e., with more than one intermediate layer 128.

Exterior wall 120 may include multiple standoff members 140 separating each spaced layer 122 from an adjacent spaced layer. Each standoff member 140 may be formed of a thermally conductive material, e.g., one or more metals. Standoff members 140 may conduct heat through exterior wall 120 and help to direct the flow of cooling medium 124 through exterior wall 120 during operation. As shown in FIG. 4, standoff members 140a may extend from an exterior face 142 of interior layer 130 to an interior face 144 of intermediate layer 128. Standoff members 140b may extend from an exterior face 146 of intermediate layer 128 to an interior face 148 of exterior layer 126. Standoff members 140 may separate spaced layers 122 by any distance, e.g., based on the characteristics of a particular turbomachine in which airfoil 100 is employed and/or flow path where the turbomachine is employed. For example, standoff members 140 may separate each spaced layer 122 a distance equal to approximately one-half to 5 times a diameter of an impingement opening discussed later herein as being formed within one or more of the spaced layers. Forming spaced layers 122 at this distance may reduce the amount of cooling medium 124 that may become stagnant between layers 122 of exterior wall 120 during operation.

Figure 5:
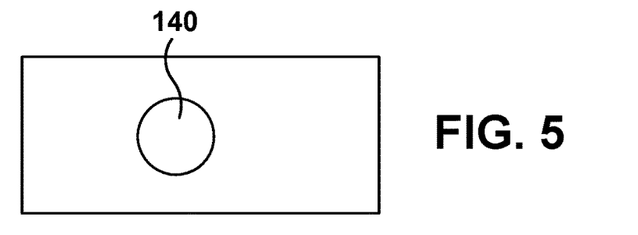
FIGS. 5-10 are cross-sectional views of various geometries of standoff members of the multilayer exterior wall of the turbine airfoil, according to embodiments of the disclosure.
Figure 6:
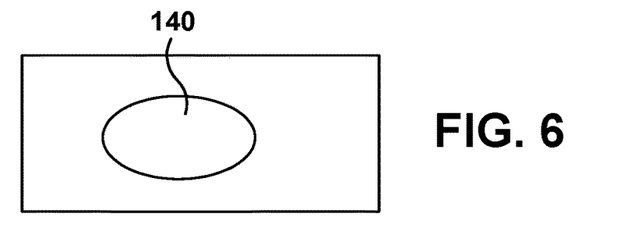
Figure 7:
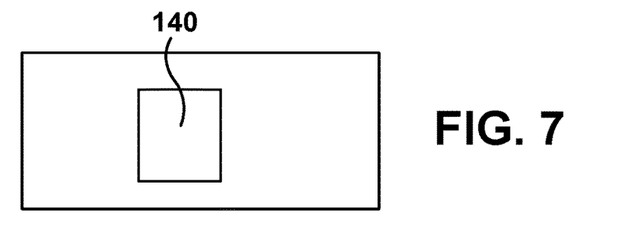
Figure 8:
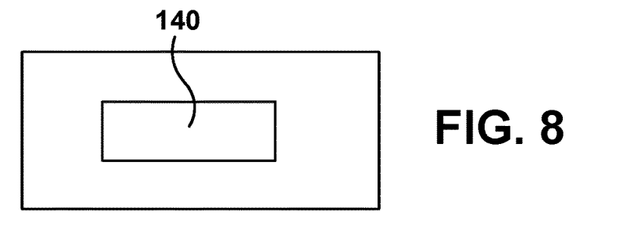
Figure 9:
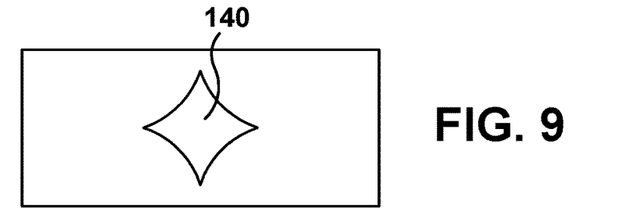
Figure 10:
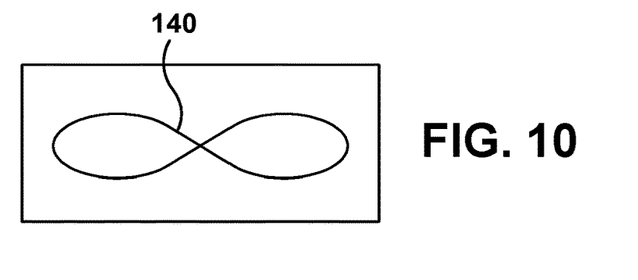

Turning briefly to FIGS. 5-10, cross-sectional views of various geometrical profiles for standoff member(s) 140 are shown. Standoff members 140 may include any desirable cross-sectional geometry for conducting heat and directing the flow of cooling medium 124 through exterior wall 120 during operation. The cross-sectional geometry may also, for example, be selected based on the characteristics of a particular turbomachine in which airfoil 100 may be employed and/or flow path where the turbomachine is employed. For example, as shown in FIGS. 5 and 6, standoff members 140 may include a round or oblong cross-sectional geometry. As shown in FIGS. 7 and 8, standoff members 140 may include a square or rectangular cross-sectional geometry. As shown in FIG. 9, standoff members 140 may include a polygonal e.g., square, cross-sectional geometry with curved sides. As shown in FIG. 10, standoff members 140 may include a curvilinear and/or composite (i.e., racetrack) cross-sectional geometry. Although shown in FIGS. 5-10 to include particular geometries and orientations, it is understood that standoff members may include any desirable cross-sectional geometry and/or orientation. Although a particular layout and number of standoff members 140 is shown in FIG. 4, it is understood that any desirable number and/or layout of standoff members may be used to separate spaced layers 122 without exceeding the scope of the disclosure. Additionally, it is understood that any number of standoff members 140 may include the same and/or different cross-sectional geometry.

Plurality of spaced layers 122 of exterior wall 120 may allow for a plurality of cooling chambers 152 to be formed within exterior wall 120 of airfoil 100. As will be discussed herein, the plurality of chambers 152 may improve the cooling of exterior wall 120 and/or airfoil 100 during operation. As shown in FIG. 4, spaces 150 between spaced layers 122 may define cooling chambers 152. For example, a first space 150a between exterior layer 126 and intermediate layer 128 may define a first cooling chamber 152a. A second space 150b between intermediate layer 128 and interior layer 130 may define a second cooling chamber 152b. As discussed above, any number of spaced layers 122 may be included in exterior wall 120 and therefore any number of cooling chambers 152 defined by spaces 150 therebetween may be included in exterior wall 120.

Exterior wall 120 may also include at least one partitioning wall 156 axially separating each cooling chamber 152 between a set of spaced layers 122 into several cooling chambers 154. Partitioning wall(s) 156 may extend into and out of the page of FIG. 4, in contrast to standoff members 140. As will be discussed further herein, partitioning walls 156 may prevent cooling medium 124 from re-entering and working fluid 116 from entering airfoil 100 in a situation where a spall induced opening (e.g., spall induced openings 210 of FIG. 12) is formed in exterior layer 126 of exterior wall 120. As shown in FIG. 4, a first set of partitioning walls 156a can axially separate first cooling chamber 152a into a plurality of first chambers 154a. Each partitioning wall 156 of the first set of partitioning walls 156a may extend from exterior face 146 of intermediate layer 128 to interior face 148 of exterior layer 126. As also shown in FIG. 4, a second set of partitioning walls 156b can axially separate second cooling chamber 152b into a plurality of second chambers 154b. Each partitioning wall 156 of the second set of partitioning walls 156b may extend from exterior face 142 of interior layer 130 to interior face 144 of intermediate layer 128.

Each partitioning wall 156 may extend substantially along an entire radial length L (FIG. 3) of airfoil 100. For example, each partitioning wall 156 may extend into and out of the page of FIG. 4 for the entire length of airfoil 100. In another non-limiting example, each partitioning wall 156 may extend along different portions of the radial length L (FIG. 3) of airfoil 100. As further shown in FIG. 4, adjacent first and second partitioning walls 156a, 156b, e.g., adjacent set 158 (in phantom), may be substantially aligned with one another. Alternatively, adjacent first and second partitioning walls 156a, 156b, e.g., adjacent set 160 (in phantom), may be non-aligned with one another. Although four partitioning walls 156 are shown in the example of FIG. 4, it is understood that any desirable number of partitioning walls may be included along pressure side 112 and/or suction side 114 of exterior wall 120 of airfoil 100.

As discussed above, airfoil 100 may include TBC 166 disposed on exterior wall 120 for exposure to working fluid 116. TBC 166 may protect airfoil 100 during exposure of the component to high temperature working fluid 116. For example, an exterior face 170 of TBC 166 may be configured to endure exposure to working fluid 116. As shown in FIGS. 3 and 4, TBC 166 may be disposed on an exterior face 168 of exterior layer 126 of exterior wall 120 of airfoil 100. TBC 166 may include any now known or later developed layers or materials configured to protect exterior surface 168 of exterior wall 120 from thermal damage (e.g., creep, thermal fatigue, cracking and/or oxidation). TBC 166 may include, for example, a ceramic blanket, zirconia, yttria-stabilized zirconia, a noble metal-aluminide such as platinum aluminide, MCrAlY alloy in which M may be cobalt, nickel or cobalt-nickel alloy and Y is yttria or another rare earth element, and/or any other now known or later developed TBC material.

TBC 166 may include one or more layers of one or more material compositions. For example TBC 166 may include a bond coat under a thermal barrier layer. In another non-limiting example not shown, TBC 166 may include a bond coat layer; an intermediate layer positioned on the bond coat layer; and an outer or insulating layer positioned on the intermediate layer. In an example where TBC 166 includes a bond coat layer (not shown), the bond coat layer may include: an aluminum rich material that includes a diffusion aluminide; MCrAlY where M is iron, cobalt, or nickel and Y is yttria or another rare earth element; or any other suitable bond coat material. In an example were TBC includes an intermediate layer, the intermediate layer may include a yttria-stabilized zirconia or any other TBC intermediate layer material. In the example where TBC 166 includes an outer or insulating layer, the insulating layer may include an ultra-low thermal conductivity ceramic material that includes, for example, a zirconium or hafnium base oxide lattice structure ($ZrO_2$ or $HfO_2$) and an oxide stabilizer compound (sometimes referred to as an oxide "dopant") that includes one or more of ytterbium oxide ($Yb_2O_3$), yttria oxide ($Y_2O_3$), hafnium oxide ($HfO_2$), lanthanum oxide ($La_2O_3$), tantalum oxide ($Ta_2O_5$), and zirconium oxide ($ZrO_2$), or any other desirable TBC insulating material.

TBC 166 may be formed on exterior face 168 by deposition and/or any other now known or later developed process for forming a TBC on a surface. TBC 166 may be formed on an exterior face 168 of exterior layer 126 after airfoil 100 has been completed. In another non-limiting example, TBC 166 may be formed on exterior face 168 before the formation of cooling passages 172 within exterior layer 126.

As best shown in FIG. 4 and as will be discussed in greater detail herein, spaced layers 122 of exterior wall 120 may each include a plurality of openings therein to direct cooling medium 124 to flow from a central chamber 172 of airfoil 100 through exterior wall 120 to exterior face 170 of TBC 166. For example, during operation, cooling medium 124 may be directed to flow from central chamber 172 along paths A, B, and/or C. Cooling medium 124 may cool airfoil 100 during exposure to high temperature working fluid 116. For example, cooling medium 124 flowing through exterior wall 120 may absorb heat from exterior wall 120, TBC 166 and/or other portions of airfoil 100.

Turning first to exterior layer 126, a plurality of cooling passages 174 may be included therein. Cooling passages 174 may allow for cooling medium 124 to exit exterior wall 120 to cool TBC 166 as it is exposed to high temperature working fluid 116. For example, cooling medium 124 may flow along path C from one or more of plurality of first cooling chambers 154*a* to exterior face 170 of TBC 166. Cooling passages 174 may have any size, shape, or configuration, e.g., selected based on the characteristics of a particular turbomachine and/or flow path where the turbomachine is employed. Any number of cooling passages 174 may be used herein. Cooling passages 174 may extend to exterior face 168 of exterior layer 126 and/or exterior face 170 of TBC 166 in an orthogonal or non-orthogonal manner.

As shown in FIGS. 3 and 4, exterior layer 126 may optionally include a plurality of plateaus 178 or raised features disposed on exterior surface 168 of exterior layer 126. Plateaus 178 may provide additional thickness to portions of exterior layer 126. The presence of plateaus 178 may allow the length of cooling passages 174 to be increased, and thus may improve the flow of cooling medium 124 therethrough. One or more cooling passages 174 may extend through plateaus 178 to an uppermost surface 180 thereof. In various embodiments, in the setting shown in FIG. 4, each plateau 178 may have a width W of approximately 0.1 inch to 1.5 inches and a height H of approximately 0.04 inch to approximately 0.15 inch. Although a particular number of plateau(s) 178 are shown in the example of FIGS. 3 and 4, it is understood that any number of plateaus may be included on exterior surface 168 of exterior layer 126. As further shown in FIG. 4, in the example wherein exterior layer 126 includes plateaus 178 disposed thereon, TBC 166 may include a thickness that is less than or equal to a height of plateaus 178. For example, as shown in both FIGS. 3 and 4, the uppermost surface 180 of plateaus 178 may remain free of TBC 166. Although surface 180 is shown in FIG. 3 to include a square geometry, it is understood that surface 180 may include any desirable shape, e.g., circular, diamond, rectangular, ovular, etc.

Turning next to intermediate layer 128 and interior layer 130 of spaced layers 122, each layer may include a plurality of impingement openings 186. Impingement openings 186 may direct the flow of cooling medium 124 to enter and pass through cooling chambers 152 of exterior wall 120 from central chamber 172 of airfoil 100. For example, as shown in FIG. 4, intermediate layer 128 may include a first plurality of impingement openings 186*a* formed therein. During operation, cooling medium 124 may be directed to flow along path A from central chamber 172 through second plurality of impingement openings 186*b* into one or more cooling chambers of the plurality of second cooling chambers 154*b*. Interior layer 130 may include a second plurality of impingement openings 186*b* formed therein. During operation, cooling medium 124 may also be directed to flow along path B from one or more cooling chambers of the plurality of second cooling chambers 154*b*, through first plurality of impingement openings 186*a*, and to one or more cooling chambers of the plurality of first cooling chambers 154*a*. As shown in FIG. 4, cooling medium 124 flowing along path B may contact interior face 148, absorbing heat therefrom and cooling exterior layer 126.

Impingement openings 186 may have any size, shape, or configuration, e.g., selected based on the characteristics of a particular turbomachine in which airfoil 100 may be employed and/or flow path where the turbomachine is employed. For example, each impingement opening 186 may include a diameter of approximately 0.012 inches to approximately 0.10 inches and may be spaced from one another by the equivalent of approximately 3 to approximately 12 diameters of the openings. As discussed above, in one example, with respect to standoff members 140, each spaced layer 122 may be separated a distance of approximately one-half to 5 times a diameter of the impingement openings which may reduce the amount of cooling medium 124 exiting the impingement openings which may become stagnant in the cooling chambers during operation. Any number of impingement openings 186 may be used herein. Impingement openings 186 may extend to an exterior face 142, 146 of interior layer 130 and/or intermediate layer 128, respectively, in an orthogonal or non-orthogonal manner. The position of first plurality of impingement openings 186*a* with respect an adjacent set of impingement openings (e.g., second plurality of impingement openings 186*a*) may be varied based on the desired flow of cooling medium 124 through exterior wall 120. For example, the relative location of impingement openings in adjacent spaced layers 122 may be adjusted to change the flow profile, turbulence, etc. of cooling medium 124 within exterior wall 120. As shown in the example of FIG. 4, first plurality of impingement openings 186*a* may not be aligned with second plurality of impingement openings 186*b*. Forming impingement openings in adjacent spaced layers 122 to not be aligned may, for example, direct cooling medium 124 along a longer path which may allow the cooling medium to absorb more heat from exterior wall 120. Although not shown, in another non-limiting example, some or all of the openings of the first plurality of impingement openings 186*a* may be substantially aligned with second plurality of impingement openings 186*b*.

Figure 12:
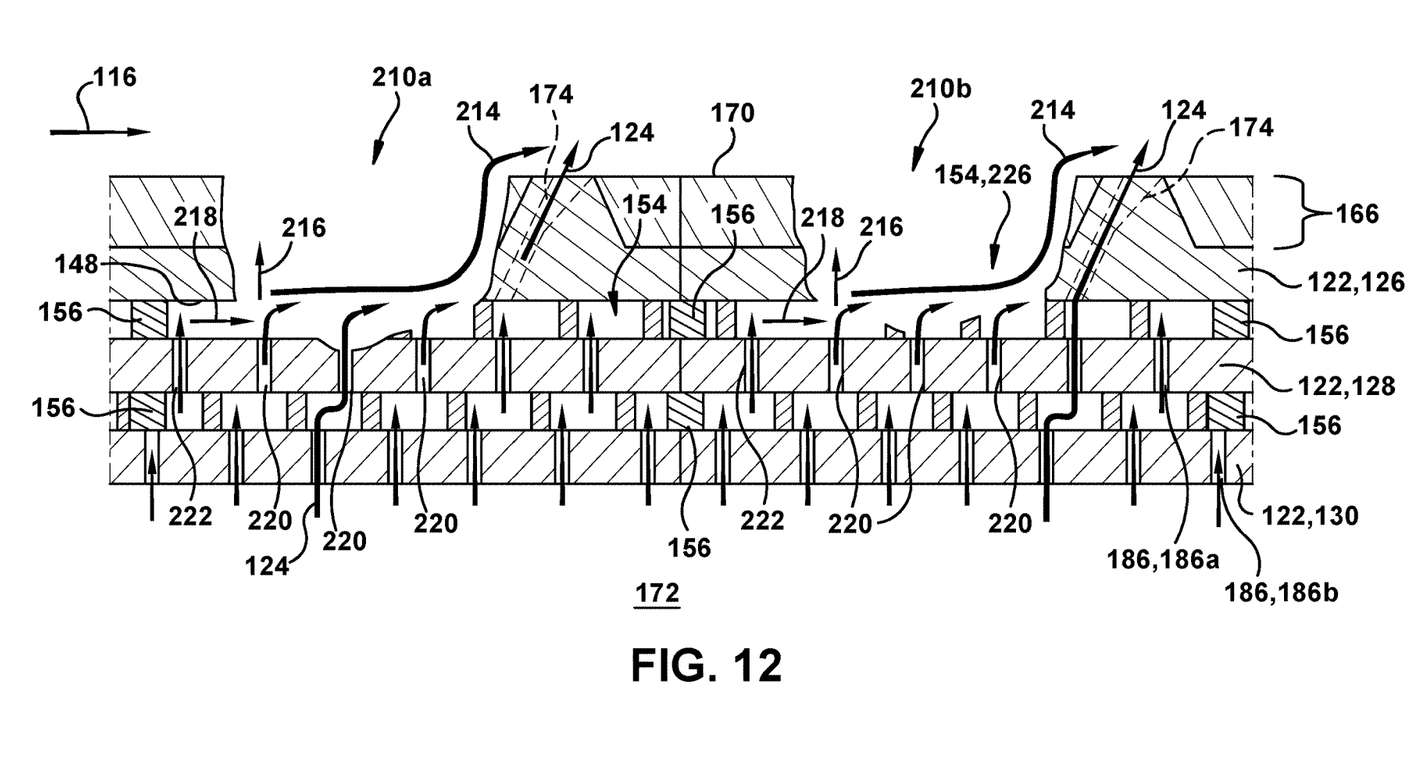
FIG. 12 is a cross-sectional view of a portion of the multilayer exterior wall of the turbine airfoil including spall induced openings in the exterior layer of the wall, according to embodiments of the disclosure.

As further shown in FIG. 4, intermediate layer 128 and/or interior layer 130 may optionally include a chamfer or diffuser portion 190 (hereinafter referred to as chamfer(s) 190) at an interface 192 between an impingement opening 186 and a face of the layer. For example, intermediate layer 128 may include a chamfer 190 at interface 192 between sidewall 192 of impingement opening 186*a* and exterior face 146 of the intermediate layer. Chamfer 190 may direct cooling medium 124 to flow more freely between cooling chambers 152*a*, 152*b*, and central chamber 172. For example, in a situation where a breach occurs in a portion of exterior wall 120 exposing a layer of the wall and impingement openings 186 therein (e.g., intermediate wall 122 and exposed impingement openings 220 as shown in FIG. 12), a chamfer on the downstream side of the exposed impingement opening(s), relative to the gas path flow direction (e.g., working fluid 116), may force cooling medium 124 to flow along the exposed surface of the exposed layer of exterior wall 120 instead of blowing off of that surface. The chamfers may, for example, improve the flow of cooling medium 124. Although two chamfers 190 are shown, it is understood that intermediate layer 128 and/or interior layer 130 may include any number, size, shape, and/or configuration of chamfers 190. Chamfers 190 may be formed, for example, during the formation of impingement openings 186a, 186b in intermediate layer 128 and interior layer 130, respectively. For example, where exterior wall 120 is additively manufactured, chamfers 190 may be formed by not depositing and sintering material at the desired location of the chamfers during the additive manufacturing process. In another non-limiting example, chambers 190 may be formed during the exposure of exterior wall 120 to working fluid 116 in the event of TBC spall. For example, although not shown, intermediate layer 128 and/or interior layer 130 may be formed to include a material at interface 192 that is configured to break down during exposure to cooling medium 124 and/or working fluid 116 to form chamfers 190. For example, the material may be designed to physically break down (e.g., melt) as a result of exposure to one or both of cooling medium 124 and working fluid 116. The material may break down upon immediate exposure or over a time period of continuous exposure. Additionally, the material may be configured to partially or completely breakdown. In the example where chamfers 190 are formed during exposure to working fluid 116, chamfers 190 may be formed along with impingement openings 186, and subsequently filled during the additive manufacturing process with a material having thermal characteristics designed to break down and expose the chamfer at a predetermined temperature (e.g., approximately 1800 degrees Fahrenheit (° F.) to approximately 2100° F.). For example, the material used to fill the chamfers may have a lower melting point than the material used to form the remainder of intermediate and/or interior layers 128, 130. The material may include, for example, nickel, cobalt or chromium-based alloys as are known in the art.

The structure of exterior wall 120 discussed herein may allow for improved cooling of airfoil 100 including exterior wall 120 as compared to conventional airfoil designs. As shown in FIG. 4, during operation, cooling medium 124 may travel along paths A, B, and C to cool exterior layer 126 having TBC 166 positioned on the exterior face thereof. The plurality of spaced layers 122 of exterior wall 120 may increase the surface area of the wall and increase the surface area in contact with cooling medium 124 flowing through cooling chambers 152 along paths A, B, and C. The structure of exterior wall 120 may also allow for the thickness of each spaced layer 122 to be reduced while maintaining the structural integrity of the wall. Reducing the thickness of the layers 122 and increasing the surface area of exterior wall 120 in contact with cooling medium 124 may reduce the temperature gradient across exterior wall 120 and increase the amount of heat cooling medium 124 is able to absorb from airfoil 100. Standoff members 140 separating spaced layers 122 of exterior wall 120 may also help conduct heat through exterior wall 120 and direct desirable flow of cooling medium 124 through exterior wall 120.

The structure of exterior wall 120 and improved cooling provided thereby may increase the lifetime of an airfoil (e.g., airfoil 100) including a TBC (e.g., TBC 166) thereon. For example, as will be discussed further herein with respect to FIG. 11, the structure of exterior wall 120 may mitigate oxidation of exterior layer 126 of the wall in a situation where a spall occurs in TBC 166 exposing a portion of the exterior layer. Additionally, as will be discussed further herein with respect to FIG. 12, the structure of exterior wall 120 may include one or more spalls and/or spall induced openings after operation over an extended time. Exterior wall 120 may account for the eventual forming of spalls and/or spall induced openings by rerouting the flow of cooling medium 124 through the spall induced openings as a cooling slot film 214. The rerouted cooling medium 124 may also contact working fluid 116 to prevent and/or mitigate the amount of working fluid 116 entering airfoil 100 through the spall induced opening(s).

Figure 11:
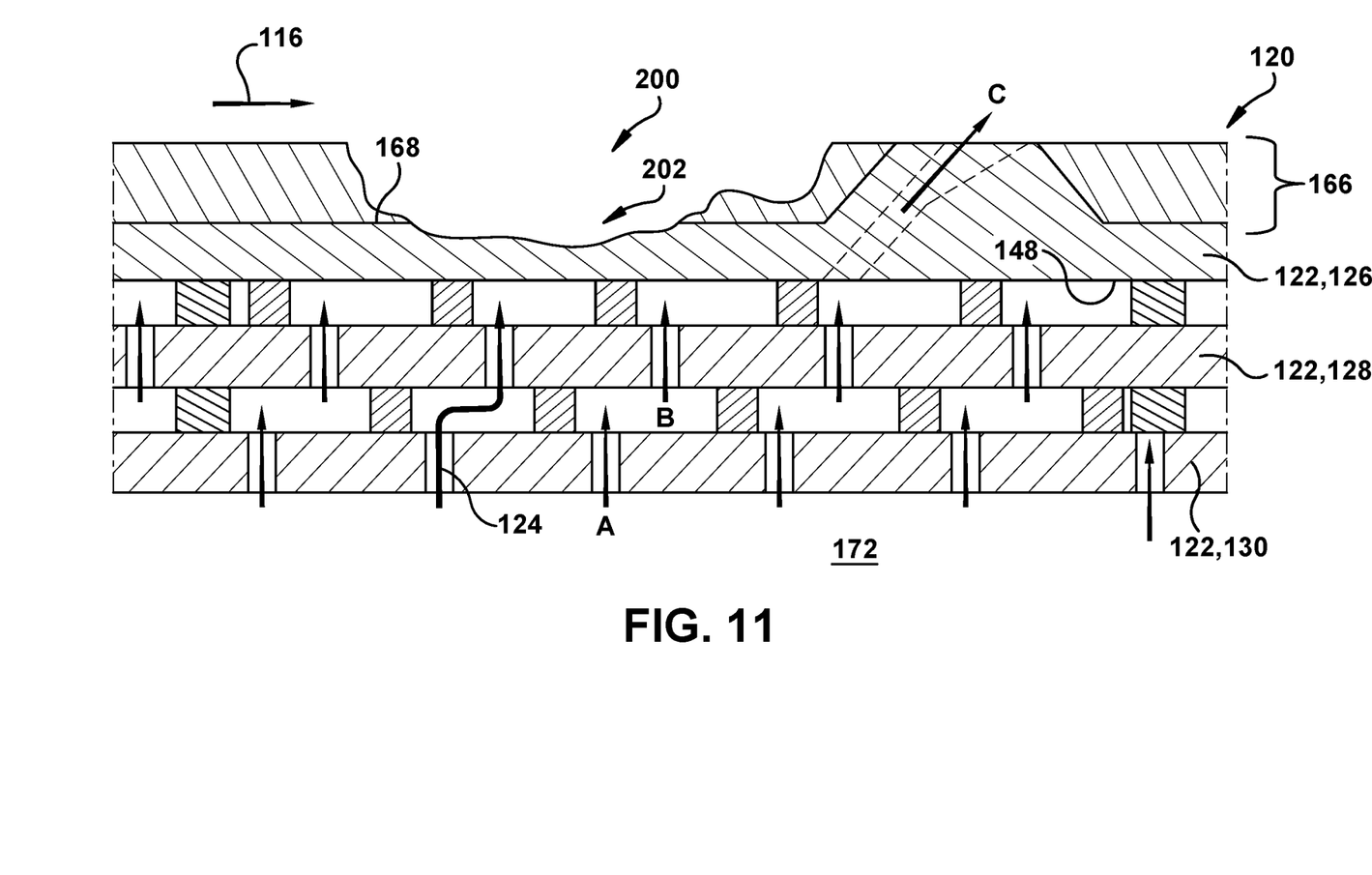
FIG. 11 is a cross-sectional view of a portion of the multilayer exterior wall of turbine airfoil including a TBC spall over the exterior layer of the wall, according to embodiments of the disclosure.

FIG. 11 shows a cross-sectional view of a portion of exterior wall 120 of airfoil 100 including a spall 200 in TBC 166. Spall 200 may include any change in TBC 166 creating a thermal path to exterior face 168 of exterior wall 120 for working fluid 116 which was not previously present. For example, spall 200 may include a break or crack in, or displacement of TBC 166 creating a thermal path to exterior face 168 of exterior wall 120. When spall 200 occurs, a portion 202 of exterior face 168 of exterior wall 120 of airfoil 100 (FIG. 3) is exposed to the high temperatures and other extreme environments of working fluid 116, where prior to spall 200 occurring, portion 202 of exterior face 168 was protected by TBC 166. After spall 200 occurs during operation, cooling medium 124 flowing through exterior wall 120 along paths A, B, and C continue to contact each of spaced layers 122 of exterior wall 120, including interior face 148 of exterior layer 126. As discussed above, exterior wall 120 having plurality of spaced layers 122 may allow for a reduction in the thickness of the layers and increase the surface area cooling medium 124 may contact. Cooling medium 124 may therefore contact and absorb heat from each of the spaced layers 122, and reduce the temperature of exterior wall 120, including the portions below portion 202 exposed to working fluid 116. Additionally, cooling fluid contacting interior face 148 of exterior layer 126 may substantially cool the entire thickness T1 of the thin exterior layer through to exterior face 168 directly exposed to working fluid 116.

Turning next to FIG. 12, a cross-sectional view of a portion of airfoil 100 including spall induced openings 210a,b in exterior layer 126 of exterior wall 120 is shown. Spalls in TBC 166 such as spall 200 as shown in FIG. 11 may cause spall induced opening 210a or 210b to occur in exterior layer 126 of exterior wall 120. For example, portion 202 of exterior face 168 as shown in FIG. 11 may eventually oxidize during the exposure to high temperature working fluid 116, forming spall induced opening 210a or 210b. When spall induced openings 210a,b occur during operation, cooling medium 124 normally exits airfoil 100 through the openings in a direction perpendicular to exterior face 170 of TBC 166. In contrast, as shown in FIG. 12, the structure of exterior wall 120 may allow for a cooling slot film and 214 to be formed over the surfaces exposed by spall induced openings 210, e.g., portions of exterior layer 126 and intermediate layer 128. The structure of exterior wall 120 may therefore increase the lifetime of an airfoil having a TBC such as TBC 166. For example, cooling slot film 214 may protect the exposed portions of exterior wall 120 from the high temperature of working fluid 116, and mitigate the oxidation of the exposed layers.

As shown in FIG. 12, exterior wall 120 may be configured to form adaptive cooling flows 216 and 218 in response to spall induced openings 210a,b. Adaptive cooling flows 216 and 218 may contact one another to form cooling slot film 214. As shown in FIG. 12, upon exposure of intermediate layer 128 including impingement openings 186a therein, an increased exit area causes a pressure gradient change across exterior wall 120 which may in turn draw a first adaptive cooling flow 216 to exposed portion 220 of impingement openings 186a at the spall induced opening(s). For example, the surface area of the plurality of spaced layers 122 at opening 210 may direct an increased backside flow of cooling medium 124 from central chamber 172 toward exposed portion 220 of impingement openings 186a to form first adaptive cooling flow 216. First adaptive cooling flow may exit the exposed portion of impingement openings 186a of intermediate layer 128 in a direction perpendicular to exterior face 146 of intermediate layer 128. As also shown in FIG. 12, in response to spall induced openings 210, a second adaptive cooling flow 218 may exit an upstream portion 222 of impingement openings 186a adjacent to exposed portion 220 of impingement openings 186a at the spall induced openings. Similarly to the flow of cooling medium 124 prior to the spall induced opening, second adaptive cooling flow 218 may travel through first cooling chamber 152a and contact interior face 148 of exterior layer 126. Cooling fluid flow may therefore exit the cooling chamber at spall induced openings 210a,b in a direction parallel to interior face 148 of exterior layer 126. As further shown in FIG. 12, second adaptive cooling flow 218 may contact first adaptive cooling flow 216 in the spall induced opening, directing first adaptive cooling flow 216 in the direction parallel to interior face 148. Second adaptive cooling flow 218 contacting first adaptive cooling flow 218 may form cooling slot film 214 over the portions of exterior wall 120 exposed by spall induced openings 210. Second adaptive cooling flow 218 and/or first adaptive cooling flow 216 may also contact working fluid 116 at opening(s) 210, directing the working fluid away from exposed intermediate layer 128 and preventing and/or mitigating the amount of working fluid entering airfoil 100 through openings(s) 210.

Although shown in a particular portion of exterior wall 120, it is understood that spall induced openings 210 may occur at any location within exterior wall 120 and may still be mitigated by the structure of exterior wall 120 disclosed herein. Additionally, although slot induced openings 210 are shown to extend only through exterior layer 126 of exterior wall 120, it is understood that spall induced openings 210 may extend further through intermediate layer 128 and/or interior layer 130 and may similarly be mitigated by the structure of exterior wall 120.

As further shown in FIG. 12, partitioning walls 156 may prevent working fluid 116 from entering, and/or cooling medium 124 from re-entering, airfoil 100 through portions of exterior wall 120 exposed by spall induced openings 210. For example, partitioning wall 156 may form a pressure differential to block working fluid 116 from entering, and/or cooling medium 124 from re-entering, a downstream portion 226 of first and/or second cooling chamber(s) 154. Partitioning walls 156 may also block the portion of cooling medium 124 exiting from spall induced opening 210a from re-entering first and/or second cooling chamber(s) 154 at a neighboring, downstream spall induced opening 210b and/or cooling passage(s) 174.

Figure 13:
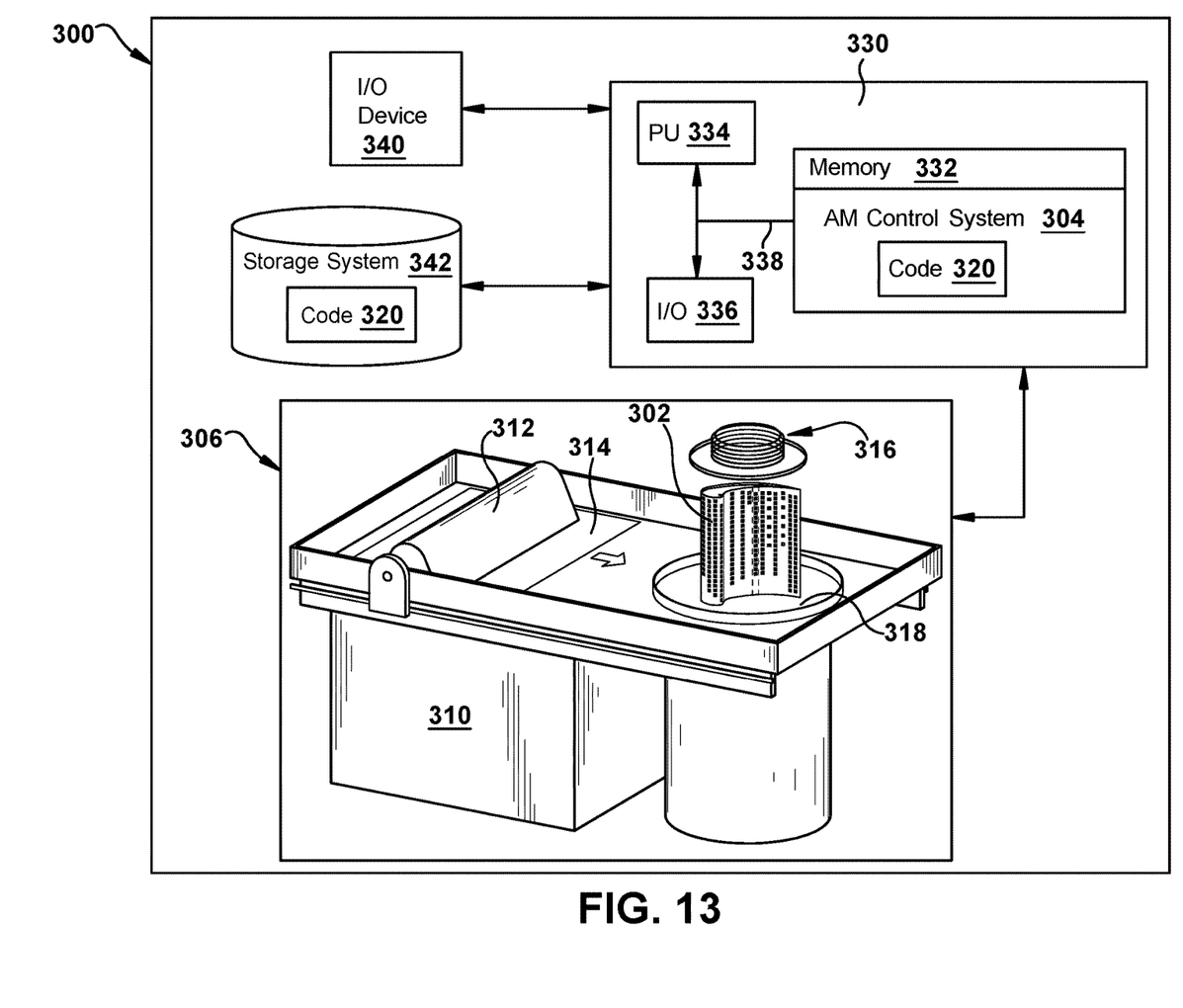
FIG. 13 is a block diagram of an additive manufacturing process including a non-transitory computer readable storage medium storing code representative of a hot gas path component in the form of a turbine airfoil, according to embodiments of the disclosure.

Referring to FIG. 13, in accordance with embodiments of the disclosure, the HGP component in the form of airfoil 100 and exterior wall 120 thereof may be additively manufactured such that structures of exterior wall 120 are integrally formed exterior wall 126. Additive manufacturing also allows for easy formation of much of the structure described herein, i.e., without very complex machining. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM).

To illustrate an example of an additive manufacturing process, FIG. 13 shows a schematic/block view of an illustrative computerized additive manufacturing system 300 for generating an object 302, i.e., airfoil 100. In this example, system 300 is arranged for DMLM. It is understood that the general teachings of the disclosure are equally applicable to other forms of additive manufacturing. AM system 300 generally includes a computerized additive manufacturing (AM) control system 304 and an AM printer 306. AM system 300, as will be described, executes code 320 that includes a set of computer-executable instructions defining exterior wall 120 (FIG. 4) including the structures thereof (e.g., plurality of spaced layers 122, standoff members 140a,140b, impingement openings 186a,186b, etc.), to physically generate the component using AM printer 306. Each AM process may use different raw materials in the form of, for example, fine-grain powder, liquid (e.g., polymers), sheet, etc., a stock of which may be held in a chamber 310 of AM printer 306. In the instant case, airfoil 100 (FIGS. 3 and 4) may be made of metal powder or similar materials. As illustrated, an applicator 312 may create a thin layer of raw material 314 spread out as the blank canvas from which each successive slice of the final object will be created. In other cases, applicator 312 may directly apply or print the next layer onto a previous layer as defined by code 320, e.g., where the material is a polymer or where a metal binder jetting process is used. In the example shown, a laser or electron beam 316 fuses particles for each slice, as defined by code 320, but this may not be necessary where a quick setting liquid plastic/polymer is employed. Various parts of AM printer 306 may move to accommodate the addition of each new layer, e.g., a build platform 318 may lower and/or chamber 310 and/or applicator 312 may rise after each layer.

AM control system 304 is shown implemented on computer 330 as computer program code. To this extent, computer 330 is shown including a memory 332, a processor 334, an input/output (I/O) interface 336, and a bus 338. Further, computer 330 is shown in communication with an external I/O device 340 and a storage system 342. In general, processor 334 executes computer program code, such as AM control system 304, that is stored in memory 332 and/or storage system 342 under instructions from code 320 representative of airfoil 100 (FIGS. 3 and 4), described herein. While executing computer program code, processor 334 can read and/or write data to/from memory 332, storage system 342, I/O device 340 and/or AM printer 306. Bus 338 provides a communication link between each of the components in computer 330, and I/O device 340 can comprise any device that enables a user to interact with computer 330 (e.g., keyboard, pointing device, display, etc.). Computer 330 is only representative of various possible combinations of hardware and software. For example, processor 334 may comprise a single processing unit, or be distributed across one or more processing units in one or more locations, e.g., on a client and server. Similarly, memory 332 and/or storage system 342 may reside at one or more physical locations. Memory 332 and/or storage system 342 can comprise any combination of various types of non-transitory computer readable storage medium including magnetic media, optical media, random access memory (RAM), read only memory (ROM), etc. Computer 330 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 332, storage system 342, etc.) storing code 320 representative of airfoil 100 (FIGS. 3 and 4). As noted, code 320 includes a set of computer-executable instructions defining object 302 that can be used to physically generate the object, upon execution of the code by system 300. For example, code 320 may include a precisely defined 3D model of airfoil 100 (FIGS. 3 and 4) and can be generated from any of a large variety of well-known computer aided design (CAD) software systems such as AutoCAD®, TurboCAD®, DesignCAD 3D Max, etc. In this regard, code 320 can take any now known or later developed file format. For example, code 320 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 320 may be translated between different formats, converted into a set of data signals and transmitted, received as a set of data signals and converted to code, stored, etc., as necessary. Code 320 may be an input to system 300 and may come from a part designer, an intellectual property (IP) provider, a design company, the operator or owner of system 300, or from other sources. In any event, AM control system 304 executes code 320, airfoil 100 (FIGS. 3 and 4) into a series of thin slices that it assembles using AM printer 306 in successive layers of liquid, powder, sheet or other material. In the DMLM example, each layer is melted to the exact geometry defined by code 320 and fused to the preceding layer.

Subsequent to additive manufacture, airfoil 100 (FIGS. 3 and 4) may be exposed to any variety of finishing processes, e.g., minor machining, sealing, polishing, assembly to another part, etc. In terms of the present disclosure, TBC 166 may be applied to exterior face 168 of exterior wall 120 of airfoil 100. TBC 166 may be applied using any now known or later developed coating techniques, and may be applied in any number of layers.

In operation, as shown in FIG. 11, following the occurrence of spall 200 in TBC 166 over exterior layer 126 the structure of exterior wall 120 allows cooling medium 124 to pass therethrough, extending the lifetime of the exterior wall and airfoil. Also in operation, as shown in FIG. 12, following the occurrence of spall induced opening(s) 210 in TBC 166 over exterior layer 126 the structure of exterior wall 120 allow for slot cooling film 214 to be formed from cooling medium 124 over portions of exterior wall 120 exposed by the spall induced openings.

Airfoil 100 according to embodiments of the disclosure provides an exterior wall 120 that cools and increases the lifespan of the 100 in response to a spall 200. The structure of exterior wall 120 may significantly reduce nominal cooling flows. Use of additive manufacturing for airfoil 100 allows for exterior wall 120 of airfoil 100 to be formed to include a multi-layer, multi-material (e.g., in the case of chamfer or diffusing portion 190), and/or multi-cooling chamber structure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine airfoil, the turbine airfoil comprising:
an exterior wall including an adaptive cooling structure:
the adaptive cooling structure includes:
a plurality of spaced layers including an exterior layer, an intermediate layer, and an interior layer, wherein each of the plurality of spaced layers are separated from an adjacent spaced layer by a plurality of standoff members;
a first plurality of impingement openings each having a first diameter within the interior layer;
a second plurality of impingement openings each having a second diameter within the intermediate layer;
a first space between the exterior layer and the intermediate layer defining a first cooling chamber;

a second space between the intermediate layer and the interior layer defining a second cooling chamber;

a first partition wall axially partitioning the first cooling chamber into a plurality of first cooling chambers;

a second partition wall axially partitioning the second cooling chamber into a plurality of second cooling chambers;

a thermal barrier coating (TBC) disposed on an exterior face of the exterior layer, the TBC having an exterior face configured to be exposed to a working fluid having a high temperature;

the first plurality of impingement openings providing a passageway for a cooling medium from a central cooling chamber of the turbine airfoil to at least one of the plurality of second cooling chambers;

the second plurality of impingement openings providing a passageway for the cooling medium from at least one of the plurality of second cooling chambers to at least one of the plurality of first cooling chambers; and a plurality of cooling passages within the exterior layer, the plurality of cooling passages providing a passageway for the cooling medium from at least one of the plurality of first cooling chambers to the exterior face of the TBC;

wherein spallation of the TBC exposes at least portions of the intermediate layer and a cooling slot opening is formed in the exterior wall, the cooling slot opening providing an adaptive cooling flow from the second plurality of impingement openings to the at least exposed portions of the intermediate layer.

2. The turbine airfoil of claim 1, wherein the first partition wall extends from an exterior face of the intermediate layer to an interior face of the exterior layer along a radial length of the turbine airfoil.

3. The turbine airfoil of claim 1, wherein the second partition wall extends from an exterior face of the interior layer to an interior face of the intermediate layer along a radial length of the turbine airfoil.

4. The turbine airfoil of claim 1, wherein the first partition wall and the second partition wall are collinear.

5. The turbine airfoil of claim 1, further comprising a plurality of plateaus disposed on the exterior face of the exterior layer, wherein each cooling passage in the plurality of cooling passages is disposed to pass through one plateau of the plurality of plateaus, and wherein an uppermost face of each plateau in the plurality of plateaus is free from the TBC.

6. The turbine airfoil of claim 1, wherein a thickness of the exterior layer is substantially equal to a thickness of at least one of the intermediate layer and the interior layer.

7. The turbine airfoil of claim 1, wherein the first space is between 0.5 and 5 times the second diameter and the second space is between 0.5 and 5 times the first diameter.

8. The turbine airfoil of claim 1, wherein the intermediate layer includes a chamfer at an interface between an exterior face of the intermediate layer and a sidewall of an impingement opening of the second plurality of impingement openings.

9. The turbine airfoil of claim 1, wherein the first plurality of impingement openings are not aligned with the second plurality of impingement openings.

10. The turbine airfoil of claim 1, wherein a cross-sectional geometry of each standoff member in the plurality of standoff members includes one of a circular, oblong, racetrack, square, square with curved sides, and rectangular geometry.

11. A hot gas path (HGP) component, the HGP component comprising:

an exterior wall including an adaptive cooling structure: the adaptive cooling structure includes:

a plurality of spaced layers including an exterior layer, an intermediate layer, and an interior layer, wherein each of the plurality of spaced layers are separated from an adjacent spaced layer by a plurality of standoff members;

a first plurality of impingement openings each having a first diameter within the interior layer;

a second plurality of impingement openings each having a second diameter within the intermediate layer;

a first space between the exterior layer and the intermediate layer defining a first cooling chamber;

a second space between the intermediate layer and the interior layer defining a second cooling chamber;

a first partition wall axially partitioning the first cooling chamber into a plurality of first cooling chambers;

a second partition wall axially partitioning the second cooling chamber into a plurality of second cooling chambers;

a thermal barrier coating (TBC) disposed on an exterior face of the exterior layer, the TBC having an exterior face configured to be exposed to a working fluid having a high temperature;

the first plurality of impingement openings providing a passageway for a cooling medium from a central cooling chamber of the turbine airfoil to at least one of the plurality of second cooling chambers;

the second plurality of impingement openings providing a passageway for the cooling medium from at least one of the plurality of second cooling chambers to at least one of the plurality of first cooling chambers;

a plurality of plateaus disposed on the exterior face of the exterior layer, wherein an uppermost face of each plateau in the plurality of plateaus is free from the TBC; and a plurality of cooling passages within the exterior layer, each cooling passage in the plurality of cooling passages disposed to pass through one plateau of the plurality of plateaus, and wherein the plurality of cooling passages provides a passageway for the cooling medium from at least one of the plurality of first cooling chambers to the exterior face of the TBC.

12. The HGP component of claim 11, wherein a thickness of the exterior layer is substantially equal to a thickness of at least one of the intermediate layer and the interior layer.

13. The HGP component of claim 11, wherein the first space is between 0.5 and 5 times the second diameter and the second space is less than between 0.5 and 5 times the first diameter.

14. The HGP component of claim 11, wherein in a situation where a spall induced opening in the TBC and exterior layer exposes a first portion of the second plurality of impingement openings, the cooling medium in the exterior wall is configured to form a slot cooling film over a portion of the exterior wall exposed by the spall induced opening.

15. A method, comprising:

additively manufacturing a turbine airfoil, the turbine airfoil including:

an exterior wall having an adaptive cooling structure: the adaptive cooling structure includes:

a plurality of spaced layers including an exterior layer, an intermediate layer, and an interior layer, wherein each of the plurality of spaced layers are separated from an adjacent spaced layer by a plurality of standoff members;

a first plurality of impingement openings each having a first diameter within the interior layer;

a second plurality of impingement openings each having a second diameter within the intermediate layer;

a first space between the exterior layer and the intermediate layer defining a first cooling chamber; a second space between the intermediate layer and the interior layer defining a second cooling chamber; wherein the first space is between 0.5 and 5 times the second diameter and the second space is between 0.5 and 5 times the first diameter;

a first partition wall axially partitioning the first cooling chamber into a plurality of first cooling chambers;

a second partition wall axially partitioning the second cooling chamber into a plurality of second cooling chambers;

the first plurality of impingement openings providing a passageway for a cooling medium from a central cooling chamber of the turbine airfoil to at least one of the plurality of second cooling chambers;

the second plurality of impingement openings providing a passageway for the cooling medium from at least one of the plurality of second cooling chambers to at least one of the plurality of first cooling chambers; and a plurality of cooling passages within the exterior layer, the plurality of cooling passages providing a passageway for the cooling medium from at least one of the plurality of first cooling chambers to an exterior face of the external layer; and applying a thermal barrier coating (TBC) on the exterior face of the exterior layer, the TBC having an exterior face configured to be exposed to a working fluid having a high temperature.

16. The method of claim 15, further comprising, in response to a spall induced opening in the exterior layer of the turbine airfoil, allowing the cooling medium to form a slot cooling film over a portion of the exterior wall exposed by the spall induced opening.

17. The method of claim 16, wherein the slot cooling film is formed by a first adaptive cooling medium exiting a first portion of the second plurality of impingement openings exposed by the spall induced opening, and a second adaptive fluid flow exiting a second portion of the second plurality of impingement openings, the second portion of the second plurality of impingement openings being adjacent to and upstream of the first portion, wherein the second adaptive fluid flow contacts the first adaptive fluid flow to direct the first adaptive fluid flow in a direction parallel to an interior face of the external layer.

18. The method of claim 16, wherein the first partition wall prevents the working fluid from entering the spall induced opening, and wherein the first partition wall prevents the slot cooling film from re-entering the spall induced opening.

19. The method of claim 15, further comprising, in response to a spall in the TBC exposing a portion of the exterior face of the exterior layer, an adaptive cooling flow travels from the central cooling chamber to an interior face of the exterior layer to substantially reduce the oxidation of the exterior layer.

20. The method of claim 15, wherein the intermediate layer includes a chamfer at an interface between an exterior face of the intermediate layer and a sidewall of an impingement opening of the second plurality of impingement openings, and further comprising allowing the chamfer to direct the cooling medium substantially in parallel with the exterior face of the intermediate layer.

* * * * *